United States Patent
Juilland et al.

(10) Patent No.: US 12,319,627 B2
(45) Date of Patent: Jun. 3, 2025

(54) ADDITIVES FOR CEMENTS COMPRISING YE'ELIMITE

(71) Applicant: SIKA TECHNOLOGY AG, Baar (CH)

(72) Inventors: Patrick Juilland, Bern (CH); Emmanuel Gallucci, Zürich (CH); Arnd Eberhardt, Winterthur (CH); Luis Pegado, Brugg (CH); Letizia Caderas, Basel (CH); Denise Schönenberger, Kollbrunn (CH); Lukas Frunz, Dietlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 821 days.

(21) Appl. No.: 17/272,483

(22) PCT Filed: Nov. 22, 2019

(86) PCT No.: PCT/EP2019/082320
§ 371 (c)(1),
(2) Date: Mar. 1, 2021

(87) PCT Pub. No.: WO2020/109186
PCT Pub. Date: Jun. 4, 2020

(65) Prior Publication Data
US 2021/0323880 A1 Oct. 21, 2021

(30) Foreign Application Priority Data
Nov. 26, 2018 (EP) .................................. 18208374

(51) Int. Cl.
| C04B 40/00 | (2006.01) |
| C04B 22/14 | (2006.01) |
| C04B 24/10 | (2006.01) |
| C04B 24/16 | (2006.01) |
| C04B 24/26 | (2006.01) |
| C04B 28/18 | (2006.01) |
| C04B 40/06 | (2006.01) |
| C04B 103/10 | (2006.01) |
| C04B 103/22 | (2006.01) |

(52) U.S. Cl.
CPC ........ *C04B 40/0039* (2013.01); *C04B 22/141* (2013.01); *C04B 24/10* (2013.01); *C04B 24/16* (2013.01); *C04B 24/2694* (2013.01); *C04B 28/188* (2013.01); *C04B 40/0658* (2013.01); *C04B 2103/10* (2013.01); *C04B 2103/22* (2013.01)

(58) Field of Classification Search
CPC ... C04B 40/0039; C04B 22/141; C04B 24/10; C04B 24/16; C04B 24/2694; C04B 28/188; C04B 40/0658; C04B 2103/10; C04B 2103/22
See application file for complete search history.

(56) References Cited

U.S. PATENT DOCUMENTS

| 2005/0133707 A1 | 6/2005 | Ichiyanagi |
| 2012/0298013 A1 | 11/2012 | Bury et al. |
| 2014/0371352 A1* | 12/2014 | Dantin ............... B01F 23/54 524/5 |
| 2015/0175887 A1* | 6/2015 | Welker ............... C09K 21/10 106/676 |

FOREIGN PATENT DOCUMENTS

| CN | 105174795 A | 12/2015 | |
| CN | 106542767 A | 3/2017 | |
| CN | 107673650 A | 2/2018 | |
| DE | 100 09 834 A1 | 9/2000 | |
| EP | 2 842 925 A1 | 3/2015 | |
| EP | 2842923 A1 * | 3/2015 | ........... C04B 28/065 |
| EP | 3 081 546 A1 | 10/2016 | |
| WO | 2008/089481 A1 | 7/2008 | |
| WO | 2018/077772 A1 | 5/2018 | |

OTHER PUBLICATIONS

Ge Zhang et al.; "Effects of superplasticizers and retarders on the fluidity and strength of sulphoaluminate cement"; Nov. 2016; vol. 126; pp. 40-42.
Feb. 13, 2020 International Search Report issued in International Patent Application No. PCT/EP2019/082320.
Feb. 13, 2020 Written Opinion issued in International Patent Application No. PCT/EP2019/082320.

* cited by examiner

*Primary Examiner* — Angela C Scott
(74) *Attorney, Agent, or Firm* — Oliff PLC

(57) ABSTRACT

A combination of retarders and regulators for hydration reaction of cementitious binders including clinkers based on Ye'elimite. Set retarders are calcium complexing agents, consisting of sugar acids, sugars, sugar alcohols, hydroxycarboxylic acids, phosphates, phosphonates, borates and amines. Regulator general formula (I) is

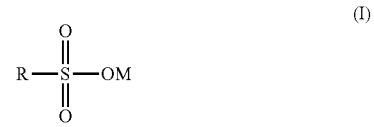

where M is H, $NH_4$ or chosen from monovalent or divalent metal of groups Ia, IIa, IIIa, Ib, IIb, IVb, VIb, VIIb or VIIIb of periodic table of elements, where M is a divalent metal, a second equivalent of R—$SO_3$ is present, and M is chosen from group consisting of H, $NH_4$, Li, Na, K, MgX, CaX, or NiX with X=$RSO_3$, and R is chosen from H, $NH_2$, OH or from hydrocarbon chain with 1-18 C atoms which may be substituted by N and/or O and/or which may be linear or branched and/or which contain one or more unsaturated bonds and/or cycloaliphatic and/or aromatic moieties.

11 Claims, 2 Drawing Sheets cumulative heat flow curve, examples M-1, M-7, M-11

Fig. 1 heat flow curve, examples M-1, M-7, M-11

Fig. 2 cumulative heat flow curve, examples M-20, M-24, M-31

Fig. 3 heat flow curve, examples M-20, M-24, M-31

Fig. 4

ADDITIVES FOR CEMENTS COMPRISING YE'ELIMITE

TECHNICAL FIELD

The invention belongs to the field of additives, especially combinations of set retarders and regulators for the hydration reaction of cementitious binders, particularly for cements comprising clinkers based on Ye'elimite. The invention also belongs to cementitious binders comprising said additives. Furthermore, the invention belongs to the use of such additives in clinkers and/or cementitious binders comprising Ye'elimite and to methods for the control of the hydration reaction at early age of cements comprising clinkers based on Ye'elimite.

BACKGROUND OF THE INVENTION

Cements used in construction typically contain ordinary Portland cement (OPC) or are based on OPC clinker. Such cements are described in EN 197-1. During production of OPC high energy consumption is encountered for sintering and milling and thus a substantial amount of $CO_2$ is released per ton of cement. Efforts from cement producers to reduce $CO_2$ emissions include the use of alternatives to OPC which are based on clinker requiring less energy for production. One such alternative is the use of cements comprising clinkers based on Ye'elimite.

During cement production the clinker is milled and typically suitable amounts of calcium sulfate and other performance improvers are added. Thus cements based on Ye'elimite can achieve similar workability and similar or even better compressive strength as cements based on OPC. However, cements based on Ye'elimite show significant faster setting compared to OPC. To ensure a workability long enough for practical application, the setting of cementitious mixtures comprising Ye'elimite based cements needs to be retarded.

The use of set retarders in cements and cementitious mixtures is common practice e.g. during production of ready-mix concrete. Set retarders prolong the setting time and increase the open time of a cementitious mixture thus enabling longer workability which is useful e.g. for transport, mixing, pumping, placing, compacting or shaping. Set retarders known in the prior art include sugars and sugar-like materials (e.g. gluconate), lignosulfonates, citric acid, tartaric acid, phosphonates, and/or boric acid and its salts.

One disadvantage of set retarders of the prior art is that besides delaying the setting of a cementitious mixture, they also delay the curing of said mixture and thus lower the compressive strength at early age and in unfavorable cases also after 28 days. Such delay of curing is disadvantageous as it also prolongs the time until a job site can be released. Yet another disadvantage of many set retarders is that, when combined with superplasticizers for cementitious binders, especially with typically used polycarboxylate-ethers (PCE), these set retarders will lead to stiffening of the mixture and thus to decreased workability.

Boric acid as well as borax (disodium tetraborate) are common set retarders for calcium sulfoaluminate (CSA) cements as they efficiently delay the setting, but have less influence on curing after 1 day as compared to other retarders. Thus early strength as well as final compressive strength of cured CSA-based materials are not reduced to a degree relevant for practical applications. Boric acid and borax are also known to be useful set retarders for cements comprising clinkers based on Ye'elimite. However, the use of boric acid or borax poses severe environment, health and safety (EHS) problems as borates may damage fertility or the unborn child.

It is thus advantageous to combine set retarders of the state-of-the art with regulators, for example accelerators, that ensure sufficient development of compressive strength at early age as well as after 28 days of curing of a cementitious mixture.

U.S. Pat. No. 7,326,920 (Kerneos) discloses a setting accelerator for OPC comprising calcium aluminate as accelerator and additionally boric acid and/or a salt of boric acid as a set retarder. The problem of EHS associated with the use of boric acid is not addressed. Furthermore, calcium aluminate tends to decrease the workability of cementitious mixtures.

WO 2008/089481 (Ceratech) discloses a combination of salts of citric acid and boric acid as accelerator/retarder combination for hydratable cements containing puzzolanic material. The problem of EHS associated with the use of boric acid is not addressed. Also the use is limited to materials containing puzzolanes.

DE 10009834 (MBT) discloses a combination of phosphonoalkylcarboxylic acid and carboxylic acid as set retarder for CSA cements. Such phosphonoalkylcarboxylic acids can have a detrimental effect on workability, especially when combined with PCE plasticizers.

U.S. Pat. No. 8,361,220 (Construction Research & Technology) discloses the use of sodium gluconate as a set retarder in cementitious binders also containing PCE. Sodium gluconate does not increase the stickiness of cementitious mixtures containing such binders. However, sodium gluconate is known to significantly lower the compressive strength of cementitious binders at early age.

None of the examples from prior art are useful combinations of set retarders and regulators for cements comprising clinkers based on Ye'elimite. Particularly, no regulators are known that can be combined with known set retarders for cements comprising clinkers based on Ye'elimite and which ensure proper development of compressive strength at early age, which have little influence on workability or even improve workability, and which are safe to handle.

There is thus a need for additives, especially for combinations of set retarders and regulators, to control the hydration reaction at early age of cementitious binders, particularly of cements comprising clinkers based on Ye'elimite, and which do not have the disadvantages mentioned above.

DESCRIPTION OF THE INVENTION

It is an object of the present invention to provide additives, especially combinations of set retarders and regulators, for cementitious binders, particularly for cements comprising clinkers based on Ye'elimite, to control the hydration reaction at early age.

It is another object of the present invention to provide cementitious binders and cementitious mixtures comprising additives, especially combinations of set retarders and regulators for cementitious binders, particularly for cements comprising clinkers based on Ye'elimite, to control the hydration reaction at early age.

It is yet another object of the present invention to provide methods for the control of the hydration reaction at early age of cements or cementitious mixtures, especially for cements or cementitious mixtures comprising Ye'elimite based clinkers.

Surprisingly, it was found that an additive according to claim 1 is a suitable combination of set retarders and regulators for cementitious binders and/or cementitious mixtures, particularly for cements comprising clinkers based on Ye'elimite, to control the hydration reaction at early age.

The object of the current invention is thus an additive for cementitious binders, particularly for cements comprising clinkers based on Ye'elimite, to control the hydration reaction at early age comprising
a) at least one set retarder S selected from the group consisting of calcium complexing agents,
b) at least one regulator R of the general formula (I)

where M is H, $NH_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of R—$SO_3$ is present, and where, preferably, M is chosen from the group consisting of H, $NH_4$, Li, Na, K, MgX, CaX, or NiX with X=$RSO_3$, and
where R is chosen from H, $NH_2$, OH or from a hydrocarbon chain with 1-18 C atoms which may be substituted by N and/or O and/or which may be linear or branched and/or which may contain one or more unsaturated bonds and/or cycloaliphatic and/or aromatic moieties.

It was found that an additive, especially a combination of set retarders and regulators, of the present invention can increase the open time or induction period of cements or cementitious mixtures comprising Ye'elimite based clinkers after the addition of mixing water. This prolongation of the open time is useful to facilitate transport, mixing, pumping, placing, compacting or shaping of cementitious mixtures comprising clinkers based on Ye'elimite.

Another advantage of an additive, especially a combination of set retarders and regulators, of the present invention is that it increases the workability of a cementitious mixture comprising cements which comprise clinkers based on Ye'elimite. Thus the initial spread flow, or initial slump, of a cementitious mixture is increased by the addition of additives of the present invention. The initial spread flow is the same or increased when additives of the present invention are used in cementitious mixtures additionally containing PCE-based superplasticizers. Additionally, a higher retention of spread flow, that is less reduction of spread flow over at least 60 min after the addition of mixing water, of a cementitious mixture comprising additives of the present invention is achieved when compared to a reference.

Additionally, it was found that an additive, especially a combination of set retarders and regulators, of the present invention does not delay the curing of a cementitious mixture comprising cements which comprise Ye'elimite based clinkers to a level relevant for practical applications. Additives of the present invention thus do not increase the final setting time and do not decrease the compressive strength of said cementitious mixtures containing such additives at early age when compared to a reference. In particular, the compressive strength of a cementitious mixture comprising additives of the present invention is increased or not decreased to a level relevant for practical application as compared to a reference when measured 24 h, preferably 16 h, more preferred 8 h after the addition of mixing water.

Furthermore, with the use of an additive, especially a combination of set retarders and regulators, of the present invention it is possible to avoid the use of boric acid or borax, which have detrimental health effects, as set retarder for cementitious binders, particularly for cements comprising clinkers based on Ye'elimite.

Finally, the use of a combination of set retarders and regulators according to the present invention may lead to less bleeding of a cementitious mixture comprising said combination of set retarders and regulators.

Further aspects of the invention are subject matter of further independent claims. Particularly preferred embodiments of the invention are subject matter of the dependent claims.

WAYS OF CARRYING OUT THE INVENTION

The term "Ye'elimite" as used in the context of the present invention refers to a calcium sulfoaluminate of the approximate composition $Ca_4Al_6O_{12}(SO_4)$. It is described as the group 7.BC.15 in the Strunz classification (s. IMA/CNMNC List of Mineral Names published by the International Mineralogical Association).

The term "clinker" as used in the context of the present invention refers to a material produced by sintering raw materials such as limestone, clay, sand, bauxite, fly ash, etc. in a kiln. The choice of raw materials and detailed sintering procedures depend on the type of clinker to be made. In the context of the present invention clinker may also be referred to as a hydraulic binder. Upon mixing with water, clinker reacts in the so-called hydration reaction to form first a cement paste and subsequently cures to form solid hydrates or hydrate phases.

Clinkers of the present invention are based on Ye'elimite. "Based on Ye'elimite" within the present invention means that the content of Ye'elimite in a clinker is between 3-95 w %, preferably 5-95%, more preferred 10-80 w %, especially 20-70 w %, each based on the total dry weight of the clinker. It is possible, and within the context of the present invention also preferred, that a clinker of the present invention also contains one or more other minerals than Ye'elimite. Such other minerals preferably are contained in a total amount of between 97-5 w %, preferably 95-5 w %, more preferred 90-20 w %, especially 80-30 w %, each based on the total dry weight of the clinker. Such other minerals are chosen from the group consisting of alite, belite, ternesite, calcite, ellestadite, aluminates, sulfates and ferrites, such as for example tetracalcium aluminoferrite. Clinkers of the present invention are preferably produced by sintering suitable raw materials at temperatures of not more than 1350° C.

A "cement" or "cementitious binder" as used in the context of the present invention refers to a material that contains at least one clinker based on Ye'elimite. A cement as referred to in the present invention preferably has a content of at least one clinker based on Ye'elimite of at least 5 w %, preferably of at least 15 w %, more preferably of at least 50 w %, especially of least 80 w %, each based on the total dry weight of the cement. In one embodiment, the cement consists to an extent of at least 95 w %, based on the total dry weight of the cement, of a clinker.

According to certain embodiments it is possible for a cement of the present invention to additionally contain other clinkers than Ye'elimite based clinkers. Such other clinkers may be any known to the person skilled in the art such as, for example, OPC. The content of clinkers other than Ye'elimite based clinkers in a cement of the present invention, if present, may vary between 0.5-85 w %, based on the total dry weight of the cement.

In one advantageous embodiment the cement additionally contains up to 40 w %, preferably up to 35 w %, especially up to 20 w %, each based on the total dry weight of the cement, of a calcium sulfate. The calcium sulfate may be present in the form of calcium sulfate-hemihydrate, calcium sulfate-dihydrate and/or anhydrite.

It is possible, and in certain cases also preferred, that the cement further contains one or more latent hydraulic binders (e.g. slag), pozzolanic binders (e.g. fly ash) and/or nonhydraulic binders (gypsum plaster, anhydrite or white lime). According to embodiments, a cement of the present invention may contain 1-95 w %, preferably 5-80 w %, especially 10-20 w %, each based on the total dry weight of the cement, of latent hydraulic and/or pozzolanic binders.

Additionally, a cement of the present invention may contain cement improvers chosen from the group consisting of grinding aids, strength improvers, activators, accelerators, plasticizers and superplasticizers. Cement improvers may be interground with the clinker during milling. They may likewise be admixed to the milled clinker.

A "cementitious mixture" as used in the context of the present invention refers to a mixture comprising at least one cement or cementitious binder as described above. It is possible, and in the context of the present invention also preferred, that the cementitious mixture additionally contains aggregates. It advantageously further contains additives common in the mortar and/or concrete industry such as for example plasticizers and/or superplasticizers, shrinkage reducers, air entrainers and/or deaerating agents, stabilizers, viscosity modifiers, water reducers, accelerators, retarders, water resisting agents, strength enhancing additives, fibres, blowing agents, pigments, corrosion inhibitors, etc. It can be advantageous to combine two or more of the mentioned additives in one cementitious mixture. A cementitious mixture of the present invention may additionally contain part or all of the mixing water.

A "set retarder" in the context of the present invention is an additive for cementitious binders and/or cementitious mixtures, which delays the hydration reaction of said cementitious binders and/or cementitious mixtures after the addition of mixing water as compared to a reference without any such additive added. Particularly, a set retarder influences the hydration reaction at an early age in such a way that the induction period of a cementitious mixture is increased, the final setting time is increased, and the curing, expressed by the gain of compressive strength, is decreased. Set retarders are described in more detail in standard EN 934-2:2012-08, table 8. One advantage of using set retarders can be for example that they enable a longer transport of mixed concrete to a job site.

A "regulator" within the context of the present invention is an additive for cementitious binders and/or cementitious mixtures, which when used in combination with a set retarder offsets the retarding effect of said set retarder on the final setting time and on the curing after the addition of water.

The effect of the at least one regulator R of the present invention thus preferably is that a cement or a cementitious mixture containing a combination of at least one set retarder S and said at least one regulator R has an open time which is the same or slightly decreased, a final setting time which is the same or decreased, and a height of the plateau of the cumulative heat flow curve which is the same or increased, as compared to the same cementitious mixture comprising only the at least one set retarder S and not the at least one regulator R.

It is likewise preferred that the effect of the at least one regulator R of the present invention is that a cement or a cementitious mixture containing a combination of at least one set retarder S and said at least one regulator R has an open time which is increased, a final setting time which is moderately increased, and a height of the plateau of the cumulative heat flow curve which is strongly increased, as compared to the same cementitious mixture comprising only the at least one set retarder S and not the at least one regulator R.

The term "the same" within the context of the present invention means a change of the respective value by not more than 5%.

The term "early age" pertains to the age of a cement or a cementitious mixture shortly after the addition of mixing water. Preferably, early age in the context of the present invention refers to a cementitious mixture of not more than 24 h, preferably not more than 20 h, in particular not more than 16 h of age after the addition of mixing water.

Figure 1:
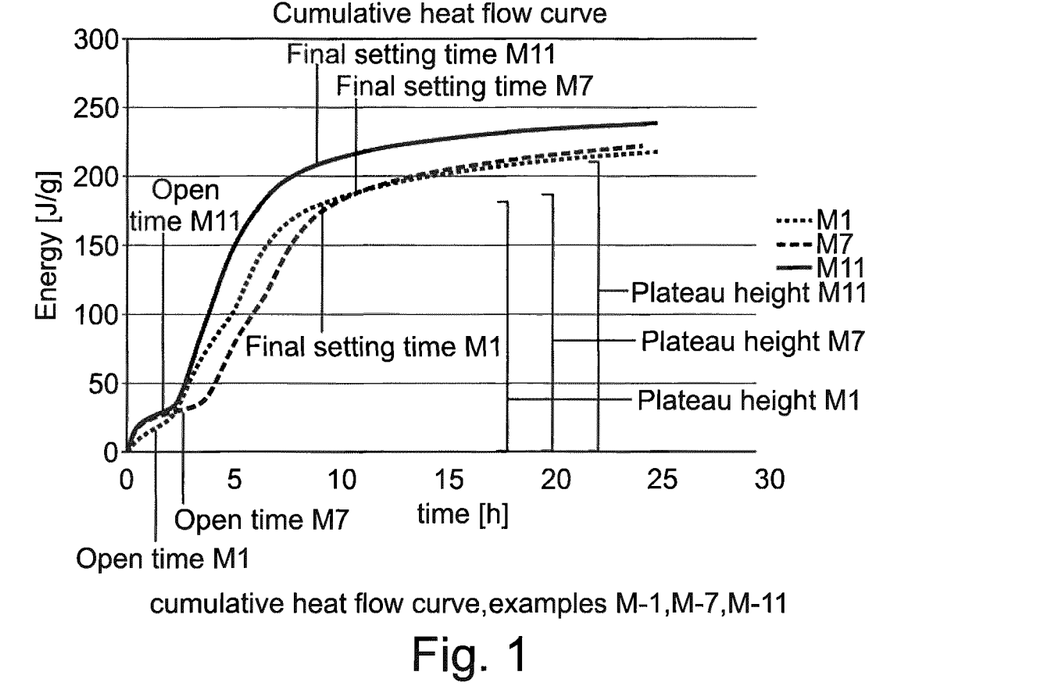
FIG. 1 shows cumulative heat flow curves on the examples of M-1, M-7, M-11.
Figure 2:
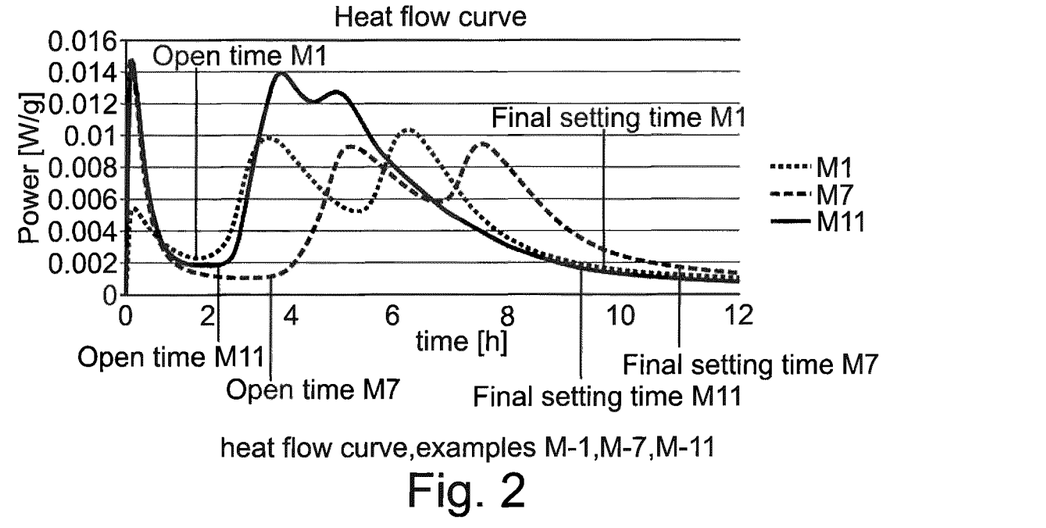
FIG. 2 shows heat flow curves on the examples of M-1, M-7, M-11.
Figure 3:
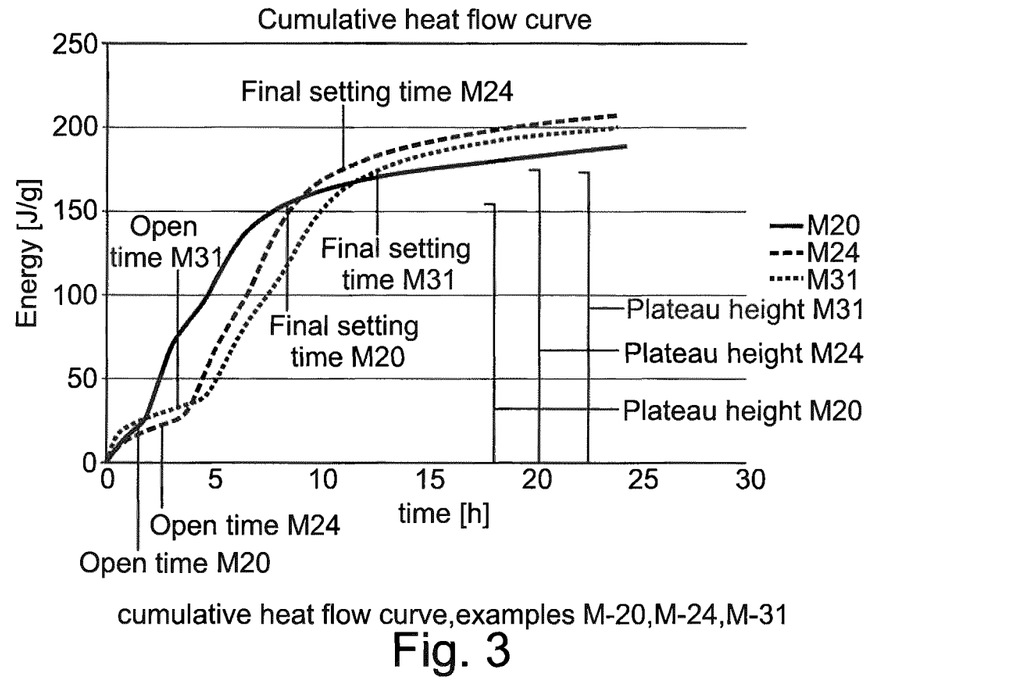
FIG. 3 shows cumulative heat flow curves on the examples of M-20, M-24, M-31.
Figure 4:
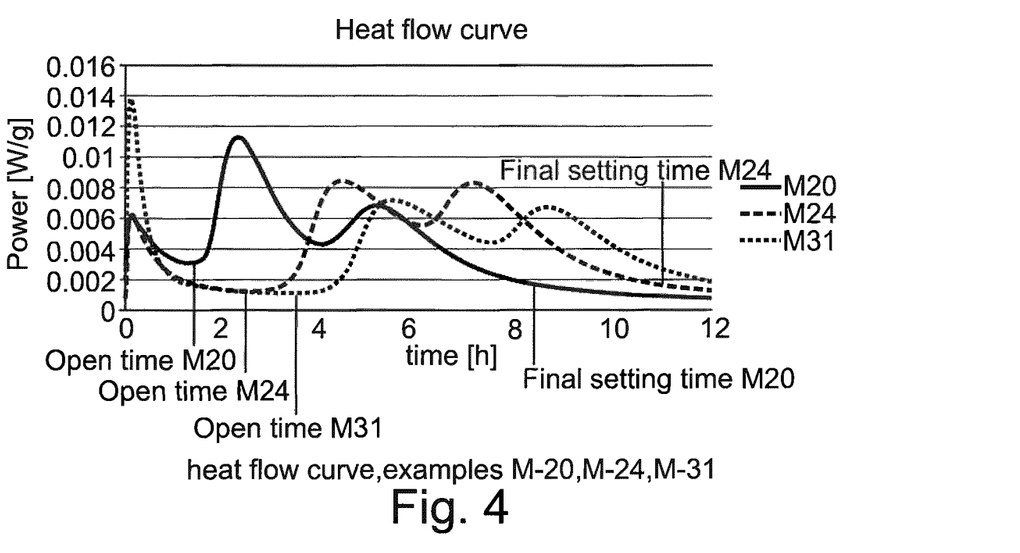
FIG. 4 shows heat flow curves on the examples of M-20, M-24, M-31.

The term "setting" within the context of the present invention means the process of hydration of a cement or cementitious mixtures starting from the addition of mixing water. The setting is finalized once the cementitious mixture has completely lost its plasticity and is sufficiently cured to attain the shape of the mould in which it is cast. A measure for the final setting time is the time elapsed from mixing of the cement or the cementitious mixture with mixing water until the cumulative heat flow curve has reached a plateau (FIGS. 1 and 3). The term "open time" or "induction period" within the context of the present invention means the time after addition of mixing water to a cement or cementitious mixture and during which time the mixture has a workability which is not significantly changed from initial. A measure for the open time is the time elapsed from mixing of the cement or the cementitious mixture with mixing water until the heat flow curve starts to increase for the first time (FIGS. 2 and 4).

The term "curing" as pertaining to a cement or cementitious mixtures within the context of the present invention means the process of hydration after setting is finished and continuing until the final compressive strength of the cementitious mixture is obtained. The compressive strength of a cementitious mixture will increase during cure. The compressive strength of a cementitious mixture can be measured according to EN 12390-1 to 12390-4 on prisms of size 40×40×160 mm. Alternatively, the compressive strength can be calculated after calibration from the height of the plateau of a cumulative heat flow curve.

A cementitious mixture containing a combination of at least one set retarder S and at least one regulator R thus also has an increased compressive strength at early age as compared to the same cementitious mixture containing the at least one set retarder S but not the at least one regulator R.

The term "control of the hydration reaction" in the context of the present invention refers to the control of the setting and curing of a cement or a cementitious mixture as described above. This control is expressed in an influence on open time, final setting time, compressive strength, which can be calculated from the height of the plateau of a cumulative heat flow curve, and spread flow as well as retention of spread flow.

A "cumulative heat flow curve" within the context of the present invention is the time dependent measurement of heat released by the hydrating cementitious mixture. The term "heat flow curve" within the context of the present invention relates to the first derivative of a cumulative heat flow curve (see FIGS. 2 and 4 as examples). A heat flow curve can be measured in an isothermal process as described in standard ASTM C1702-17. For the present invention, heat flow curves were measured on a TAM AIR from TM Instruments and an I-CAL 4000 from Calmetrix. Cumulative heat flow curves were calculated from heat flow curves by integration using software default parameters.

FIGS. 1 and 3 show examples of cumulative heat flow curves. Energy released per gram of cement in the hydrating cementitious mixture is plotted versus the time after the addition of mixing water. Open time, final setting time as well as plateau height are marked for the respective curves. The open time is the first point of inflection of the cumulative heat flow curve. Within the context of the present invention, the final setting was measured on the cumulative heat flow curve as the time when the increase in energy measured per 12 min becomes less than 0.1 J/g. The plateau height is the energy released per g of cement at the final setting time. FIGS. 2 and 4 show examples of heat flow curves. Power per gram of cement in the hydrating cementitious mixture is plotted versus the time after the addition of mixing water. The initial peaks between 0 and 1 hour pertain to the mixing process and are disregarded.

Surprisingly, it was found that a combination of at least one set retarder S selected from the group consisting of calcium complexing agents and at least one regulator R of the general formula (I)

where M is H, NH$_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of R—SO$_3$ is present, and where, preferably, M is chosen from the group consisting of H, NH$_4$, Li, Na, K, MgX, CaX, or NiX with X=RSO$_3$, and where R is chosen from H, NH$_2$, OH or from a hydrocarbon chain with 1-18 C atoms which may be substituted by N and/or O and/or which may be linear or branched and/or which may contain one or more unsaturated bonds and/or cycloaliphatic and/or aromatic moieties, is able to efficiently prolong the open time and at the same time regulate the setting and/or curing of cements or cementitious mixtures comprising Ye'elimite based clinkers.

In particular, the open time of a cement or cementitious mixture containing at least one set retarder S and at least one regulator R is increased by at least 15% when compared to a reference without any set retarder S and regulator R.

At the same time, the final setting time is increased by not more than 75% when compared to a reference without any set retarder and regulator and is decreased when compared to a reference containing only the set retarder S but not the regulator R. Furthermore, the height of the plateau of the cumulative heat flow curve of a cement or cementitious mixture containing at least one set retarder S and at least one regulator R is the same or increased when compared to either a reference without any set retarder S and regulator R or to a reference containing only the set retarder S but not the regulator R.

As the height of the plateau of the cumulative heat flow curve of a cement or cementitious mixture containing at least one set retarder S and at least one regulator R increases, also the compressive strength of the respective cement or cementitious mixture of the present invention is increased after curing for 4 h, 6 h or 8 h at 23° C./50% r.h. as compared to the compressive strength of a reference without an additive of the present invention.

Another advantage of the combination of the at least one set retarder S selected from the group consisting of calcium complexing agents and the at least one regulator R of the general formula (I) is that it does increase the workability of a cementitious mixture containing a cement comprising clinkers based on Ye'elimite, comprising said compounds. Thus, initial spread flow is the same or better and retention of spread flow over the first 60 min after addition of mixing water is better of a cementitious mixture of the present invention when compared to a reference without any set retarder S and regulator R added, even if the said cementitious mixture additionally comprises PCE.

It is thus a first aspect of the present invention to provide an additive, especially a combination of at least one set retarder and at least one regulator, for cementitious binders and/or cementitious mixtures comprising clinkers based on Ye'elimite, containing or essentially consisting of a combination of at least one set retarder S and at least one regulator R.

The at least one set retarder S of the additive of the present invention is selected from the group consisting of calcium complexing agents. Calcium complexing agents can be any chemicals capable of forming complexes with calcium ions. According to embodiments the at least one set retarder S of the present invention is chosen from the group consisting of sugar acids, sugars, sugar alcohols, hydroxycarboxylic acids, phosphates, phosphonates, borates and amines.

A "sugar acid" in the context of the present invention is a monosaccharide with a carboxyl group. It may belong to any of the classes of aldonic acids, ulosonic acids, uronic acids or aldaric acids. Preferably, it is an aldonic acid. Examples for sugar acids useful in the context of the present invention include but are not limited to glyceric acid, xylonic acid, gluconic acid, ascorbic acid, neuraminic acid, glucuronic acid, galacturonic acid, iduronic acid, tartaric acid, mucic acid, and saccharic acid. The sugar acid may be present in form of the free acid or as a salt. According to embodiments, salts of sugar acids can be salts with metals of groups Ia, IIa, Ib, IIb, IVb, VIIIb of the periodic table of elements. Preferred salts of sugar acids are salts of alkali and alkali earth metals, iron, cobalt, copper, or zinc. Especially preferred are salts with monovalent metals such as lithium, sodium, and potassium.

A "sugar" in the context of the present invention is a carbohydrate bearing an aldehyde group. In particularly preferred embodiments the sugar belongs to the group of monosaccharides or disaccharides. Examples of sugars include but are not limited to glycerinaldehyde, threose, erythrose, xylose, lyxose, ribose, arabinose, allose, altrose, glucose, mannose, gulose, idose, galactose, tallose, fructose, sorbose, lactose, maltose, sucrose, lactulose, trehalose, cellobiose, chitobiose, isomaltose, palatinose, mannobiose, raffinose, and xylobiose.

A "sugar alcohol" in the context of the present invention is a polyhydric alcohol derivable from sugars by a redox reaction. Sugar alcohols thus belong to the class of alditols.

Examples for sugar alcohols include but are not limited to ethylene glycol, glycerol, diglycerol, threitol, erythritol, pentaerythritol, dipentaerythritol, xylitol, ribitol, arabitol, sorbitol, sorbitan, isosorbide, mannitol, dulcitol, fucitol, iditol, inositol, volemitol, lactitol, maltitol, isomalt, maltotriitol, maltotetraitol, and polyglycitol.

A "hydroxycarboxylic acid" in the context of the present invention is a carboxylic acid additionally comprising an OH-moiety within the same molecule. Examples for hydroxycarboxylic acids include but are not limited to malic acid, citric acid, isocitric acid, tartronic acid, mandelic acid, salicylic acid, and lactic acid. The hydroxycarboxylic acid may be present in form of the free acid or as a salt.

According to embodiments, salts of hydroxycarboxylic acids can be salts with ammonium or with metals of groups Ia, IIa, Ib, IIb, IVb, VIIIb of the periodic table of elements. Preferred salts of hydroxycarboxylic acids are alkali metal salts, earth alkali metal salts or ammonium salts.

A "phosphate" in the context of the present invention is a derivative of phosphoric acid. A phosphate can be the free phosphoric acid, an oligomer of phosphoric acid, and/or a polymer of phosphoric acid such as for example diphosphate, triphosphate, tetraphosphate and the like. Phosphates can be present in a protonated, partially deprotonated or fully deprotonated state. They can also be fluorinated. Examples of suitable phosphates are trisodium ortho-phosphate and, tetrasodium pyrophosphate, sodium hexametaphosphate, and disodium fluorophosphate. It is likewise possible that a "phosphate" refers to an ester of phosphoric acid or to an ester of one of its oligomers. Esters of phosphoric acids include but are not limited to mixed esters with the above mentioned hydroxycarboxylic acid and/or sugar acids, mixed esters with carboxylic acids, especially with fatty acids, alkylesters, arylesters, esters with polyalkylene glycols.

The term "phosphonate" likewise pertains to mono-, di-, tri-, tetra-, penta- or hexa-phosphonic acids, as well as oligomers and/or esters thereof. Preferably, phosphonates bear organofunctional moieties. Phosphonates can be present in a protonated, partially deprotonated or fully deprotonated state. Examples of suitable phosphonates are 1-hydroxyethylidene-1,1-diphosphonic acid, 2-phosphonobutane-1,2,4-tricarboxylic acid, 3-aminopropylphosphonic acid, aminotri(methylenephosphonic acid), and diethylentriaminepenta(methylenephosphonic acid).

A "borate" within the context of the present invention preferably is boric acid, a salt of boric acid or borax.

Within the context of the present invention an "amine" preferably relates to polyamines which contain two or more amino groups. Useful polyamines are aliphatic, cycloaliphatic, heterocyclic and/or aromatic polyamines. Especially useful polyamines are for example ethylenediamine, hexylenediamine, diethylenetriamine, triethylenetetramine, tetraethylenepentamine, isophoronediamine, polyaminoalcohols such as aminoethylethanolamine, tetra(hydroxyethyl) ethylenediamine, polyaminocarboxylates such as iminodisuccinic acid, ethylenediaminetetraacetic acid, ethylenediaminedisuccinic acid or polyaspartic acid, which can be present in form of the free acid or in form of their salts, especially in form of their sodium salts.

It is possible, and in certain cases preferred, to use mixtures of different calcium complexing agents S. Preferably, the at least one set retarder S is chosen and dosed in way as not to decrease the workability of a cement or cementitious mixture of the present invention.

In an especially preferred embodiment, the set retarder S of the additive of the present invention is a sugar acid or the alkali metal salt of a sugar acid. In particular, the sugar acid is gluconic acid or an alkali metal salt of gluconic acid. Especially, the set retarder S is sodium gluconate with a purity of at least 90%, preferably 95%, most preferred 99%. One advantage of using sodium gluconate as the at least one set retarder S is that this will prevent a cementitious mixture of the present invention to stiffen after the addition of mixing water. Sodium gluconate needs to be dosed in an amount of at least 0.05 w %, based on the total dry weight of the clinker, to prevent stiffening of the cementitious mixture.

The at least one regulator R of the additive of the present invention is of the general formula (I)

(I)

where M is H, $NH_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of $R-SO_3$ is present, and where, preferably, M is chosen from the group consisting of H, $NH_4$, Li, Na, K, MgX, CaX, or NiX with $X=RSO_3$, and where R is chosen from H, $NH_2$, OH or from a hydrocarbon chain with 1-18 C atoms which may be substituted by N and/or O and/or which may be linear or branched and/or which may contain one or more unsaturated bonds and/or cycloaliphatic and/or aromatic moieties.

In a preferred embodiment, M is chosen from H, $NH_4$, Li, Na, K, MgX, CaX, or NiX with $X=RSO_3$, most preferred from H, $NH_4$, Li, or Na.

R is preferably chosen from alkyl groups of 1-8 C atoms, especially from methyl, ethyl, propyl or butyl with methyl being most preferred, or from unsubstituted or substituted aryl groups, especially from phenyl, toluyl, naphthyl, 4-aminophenyl or 4-alkylphenyl. It is likewise preferred that R is an amino group or an alkyl group substituted with at least one nitrogen atom.

In one preferred embodiment of the present invention, R is a methyl group. In another preferred embodiment of the present invention, R is an amino group.

Examples for the at least one regulator R of the general formula (I) include but are not limited to sulfonic acids, e.g. methylsulfonic acid, phenylsulfonic acid, toluenesulfonic acid, and naphthylsulfonic acid, sulfonates, e.g. sodium tetrapropylenebenzenesulfonate, and sodium dodecylbenzenesulfonate, amidosulfonic acid and its salts (also called sulfamates), aminosulfonic acids, e.g. aminomethanesulfonic acid, N-cyclohexyl-2-aminoethanesulfonic acid, taurine, and sulfanilic acid. In a preferred embodiment, the at least one regulator R of the general formula (I) is methylsulfonic acid or amidosulfonic acid or a mixture of methylsulfonic acid and amidosulfonic acid.

A suitable molar ratio of the at least one set retarder S to the at least one regulator R is from 1:2 to 1:450 mol/mol, preferably from 1:10 to 1:400 mol/mol, more preferably from 1:20 to 1:300 mol/mol. A molar ratio of the at least one set retarder S to the at least one regulator R of 1:1 mol/mol means that for 1 mol of all set retarders S 1 mol of all regulators R are present. Higher molar ratios than defined above will lead to less set-retarding properties of the additive.

It is possible that the additive of the current invention contains one or more further materials which are commonly used in the field of concrete additives. Such materials can be plasticizers and/or superplasticizers, shrinkage reducers, air entrainers and/or de-aerating agents, stabilizers, viscosity modifiers, water reducers, accelerators, retarders, water resisting agents, strength enhancing additives, blowing agents, pigments, fillers, corrosion inhibitors, detergents, solvents and/or water.

The additive of the present invention can be a one component pre-mix of at least one set retarder S selected from the group consisting of calcium complexing agents and at least one regulator R of the general formula (I) in a ratio as described above. In cases where compounds S and R are liquids, said pre-mix can be obtained by mixing the two or more liquid compounds by any process known to the person skilled in the art. The pre-mix thus obtained may be a solution, an emulsion, or a multiple-phase mixture. It may be present in form of a liquid or a paste. It may also be further processed to obtain a solid, for example by spray drying. In cases where compounds S and R are solids, said pre-mix can be obtained by mixing the two or more solid compounds by any process known to the person skilled in the art. The pre-mix thus obtained may be in form of a powder or a paste. In cases where at least one of the compounds S and R is a liquid and at least one other compound S and R is a solid, said pre-mix can be obtained by mixing the compounds by any process known to the person skilled in the art or by absorbing the at least one liquid on the at least one solid. The pre-mix thus obtained may be in the form of a solid, a paste, a dispersion, or a solution.

One component pre-mixes of compounds S and R of the present invention thus obtained can be stored and are stable at temperatures between $-10°$ C. to $+40°$ C. for at least 1 week. Stable means that the effect of the additive after storage on setting and compressive strength is changed by 10% or less compared to the same effects before storage.

A one-component additive of the present invention obtained by any of the processes described above may contain further materials such as solvents, solubilizers, detergents, emulsifiers and/or anti-settling agents.

The premixed compounds S and R of the present invention may be added during production of a cement, to the dry mix of a cementitious binder or cementitious mixture. They may also be added together with or shortly after the mixing water.

It is likewise possible to provide the additive of the present invention as two separate components α and β, with component α comprising the at least one set retarder S selected from the group consisting of calcium complexing agents, and with component β comprising the at least one regulator R of the general formula (I). Component α and component β are stored in separate containers or in spatially separate compartments of one container. It is possible to pre-mix both components α and β shortly before addition to a cement or a cementitious mixture. Premixing is possible by any process known to the person skilled in the art. The premixed components α and β may be added to the dry mix, together with or shortly after the mixing water. It is likewise possible to dose both components α and β separately to a clinker, a cement or a cementitious mixture. It is for example possible, and in certain cases also preferred, to mix both components α and β to the dry mix of a cementitious mixture. It is likewise possible, and in certain cases preferred, to mix only one component σ or β to the dry mix and add the other component α or β together with or shortly after the mixing water. Furthermore it is possible to add one component α or β together with or shortly after the mixing water and the other component α or β at a later stage, for example shortly before or during placement. It is finally possible to add both components α or β together with or shortly after the mixing water.

According to embodiments of the present invention the component α is added before the component β. It is, for example, possible to add the component α during the production of clinker or cement or to the dry mix of a cementitious mixture and add the component β shortly before, together with or shortly after the mixing water.

Both components α or β of the additive of the present invention preferably can be stored and are stable at temperatures between $-10°$ C. to $+40°$ C. for at least 1 week.

Stable means that the effect of the additive after storage on setting and compressive strength is changed by 10% or less compared to the same effects before storage.

Both components α or β of a two-component additive of the present invention may contain, independently from each other, materials other than compounds S and R such as solvents, solubilizers, detergents, emulsifiers and/or anti-settling agents.

It is a second aspect of the present invention to provide a cementitious binder comprising
 a) at least one clinker
 b) at least one set retarder S selected from the group consisting of calcium complexing agents
 c) at least one regulator R of the general formula (I)

(I)

where M is H, $NH_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of R—$SO_3$ is present, and where, preferably, M is chosen from the group consisting of H, $NH_4$, Li, Na, K, MgX, CaX, or NiX with X=$RSO_3$, and where R is chosen from H, $NH_2$, OH or from a hydrocarbon chain with 1-18 C atoms which may be substituted by N and/or O and/or which may be linear or branched and/or which may contain one or more unsaturated bonds and/or cycloaliphatic and/or aromatic moieties.

The clinker and cementitious binder are as defined above.

The cementitious binder of the present invention can be present in a dry state, for example as a powder, or as a mixture with solvents and/or mixing water with a fluid or paste like consistency. The cementitious binder of the present invention can also be present in a cured state, e.g. as a shaped body, as a building or as part of a construction.

A cementitious binder of the present invention contains between 0.01-2 w %, preferably between 0.025-1 w %, especially between 0.03-0.5 w %, each based on the total dry weight of the cement, of the at least one set retarder S of the present invention and between 0.1-6 w %, preferably between 0.2-5 w %, especially 0.25-2 w %, each based on the total dry weight of the cement, of at least one regulator R selected from the general formula (I).

Preferred ratios of the at least one set retarder S to the at least one regulator R are from 1:2 to 1:450 mol/mol, preferably from 1:10 to 1:400 mol/mol, more preferably from 1:20 to 1:300 mol/mol.

A higher dosage of an additive of the present invention using the at least one set retarder S and the at least one regulator R at any given ratio within the limits as defined above, can lead to a longer open time.

According to embodiments of the present invention, the ratio of the at least one set retarder S to the at least one regulator R can be adjusted to the dosage of the at least one set retarder S. Especially, the ratio of the at least one set retarder S to the at least one regulator R can be increased if the dosage of the at least one set retarder S is increased. One preferred ratio of the at least one set retarder S to the at least one regulator R is, for example, a ratio of between 1:10-1:100 mol/mol if the dosage of the at least one set retarder S is 0.05 w %, based on the total dry weight of the cement. Another preferred ratio of the at least one set retarder S to the at least one regulator R is, for example, a ratio of at least 1:100 mol/mol if the dosage of the set retarder is at least 0.15 w %, based on the total dry weight of the cement.

It is a third aspect of the present invention to provide a cementitious mixture comprising the cementitious binder of the present invention as described above and additionally comprising
  a) water,
  b) optionally aggregates, and
  c) optionally one or more further additive selected from the group consisting of plasticizers, superplasticizers, shrinkage reducers, air entrainers, deaerating agents, stabilizers, viscosity modifiers, water reducers, accelerators, retarders, water resisting agents, strength enhancing additives, fibres, blowing agents, pigments and steel passivating agents.

Water can be any water available at the site of mixing such as distilled water, purified water, tap water, mineral water, spring water, well water, waste water, or salt water. Water is added in a water/cement ratio of between 0.1-2.0, preferably 0.2-1.0, especially 0.25-0.6.

The cementitious mixture of the present invention preferably contains aggregates. Aggregates can be any material that is non-reactive in the hydration reaction of clinkers. Aggregates can be any aggregate typically used for cementitious binders. Typical aggregates are for example rock, crushed stone, gravel, slag, sand, quartz sand, recycled concrete, glass, perlite or vermiculite. Aggregates useful for the present invention can have any shape and size typically encountered for such aggregates. Aggregates, useful for the present invention, are as described in EN 12620:2008-07 and EN13139:2015-07.

It can also be advantageous if the cementitious mixture of the present invention further contains one or more additives selected from the group consisting of plasticizers, superplasticizers, shrinkage reducers, air entrainers, deaerating agents, stabilizers, viscosity modifiers, water reducers, accelerators, retarders, water resisting agents, strength enhancing additives, fibres, blowing agents, pigments and steel passivating agents.

It can be particularly advantageous to add a superplasticizer to a cement or a cementitious mixture of the present invention. Superplasticizers can be any known to the person skilled in the art. Particular suitable superplasticizers can be polycarboxylic ethers (PCE). Polycarboxylic ethers are comb polymers with a polycarboxylic backbone and polyalkyleneoxide side-chains. Such polycarboxylic ethers are for example described in EP 2 468 696 (Sika Technology AG).

Superplasticizers, in particular polycarboxylic ethers, can be added to a cement or a cementitious mixture of the present invention in 0-10 w %, preferably 0.010-7.5 w %, especially 0.015-2.5 w %, calculated as dry weight of superplasticizer, based on the total weight of the cement contained.

Other suitable superplasticizers include lignosulphonates, polynaphthalene sulphonates, polyamine sulphonates, vinyl copolymers and polyethyleneoxide phosphonates. It can be preferred to add a mixture of different superplasticizers to a cement or a cementitious mixture of the present invention.

A cement or cementitious mixture of the present invention thus preferably contains or consists of
  a) 5-99 w % of at least one clinker,
  b) 0.01-2% of at least one set retarder S selected from the group consisting of calcium complexing agents,
  c) 0.1-6 w % of at least one regulator R of the general formula (I)

where M is H, $NH_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of R—$SO_3$ is present, and where, preferably, M is chosen from the group consisting of H, $NH_4$, Li, Na, K, MgX, CaX, or NiX with X=$RSO_3$, and where R is chosen from H, $NH_2$, OH or from a hydrocarbon chain with 1-18 C atoms which may be substituted by N and/or O and/or which may be linear or branched and/or which may contain one or more unsaturated bonds and/or cycloaliphatic and/or aromatic moieties,
  d) 0-10 w % of a superplasticizer,
  e) optionally aggregates,
  f) optionally water.

It is a fourth aspect of the present invention to provide a method for regulating the hydration reaction of a cement or a cementitious mixture, comprising clinkers based on Ye'elimite, at early age. In particular, the setting of said cement or cementitious mixture is retarded and the open time is thus increased, while the final setting time as well as the compressive strength at early age of said cement or cementitious mixture either are not changed to a degree relevant for practical application or, if the final setting time is increased, the compressive strength is also increased.

The method for regulating the hydration reaction of a cement or a cementitious mixture, comprising clinkers based on Ye'elimite, at early age comprises the steps of
  a) providing a cement or a cementitious mixture comprising clinkers based on Ye'elimite,
  b) providing at least one set retarder S, selected from the group consisting of calcium complexing agents,
  c) providing at least one regulator R of the general formula (I)
  d) providing water
  e) optionally providing aggregates
  f) optionally providing further additives
  g) mixing a) to f) in any given order.

The at least one set retarder S and the at least one regulator R of the present invention may be provided at the same time as individual components or as a pre-mix as described above. The at least one set retarder S and the at least one regulator R of the present invention may likewise be provided as separate components α and β as described above.

According to embodiments of the present invention the at least one set retarder S and/or the at least one regulator R are admixed to a Ye'elimite based clinker before or after milling of the clinker. The at least one set retarder S and/or the at least one regulator R may, for example, be introduced into a mill in small dosages and be interground with the clinker to attain a uniform powdery cement. It is preferred within the context of the present invention that only the at least one set retarder S is admixed to the Ye'elimite clinker before or after milling. Other grinding aids for clinkers known to the person skilled in the art may be used in addition such as for example glycols, alkanolamines, amineacetates, aromatic acetates. Said uniform powdery cement may be stored prior to further mixing. It is then, for example, possible to mix said cement with additional set retarder S and with regulator R, provided that dosages and ratios as described above are met, then mix with water and optionally aggregates and optionally other additives. It is, in other words, possible to modify a clinker or cement with at least one set retarder S, store and/or transport said cement, and add the at least one regulator R shortly before, together with, or shortly after the mixing water.

In another embodiment of the present invention the at least one set retarder S and the at least one regulator R are mixed with a cement or the dry mix of a cementitious mixture. Admixing can be done by any process known to the person skilled in the art. As described above, the at least one set retarder S and the at least one regulator R can be admixed together as a pre-mix or individually. It is preferred, however, that the at least one set retarder S is admixed first as this will lead to a longer open time of the cementitious mixture. The complete mass of the at least one set retarder S and the at least one regulator R can be added to the cementitious mixture at once or it can be added in several, smaller portions. It is then possible to mix with water and optionally aggregates and optionally other additives.

In yet another embodiment of the present invention the at least one set retarder S and/or the at least one regulator R are pre-mixed with the mixing water and then added to the cement or cementitious mixture as described above. It is then, for example, possible to mix with additional set retarder S and/or regulator R, provided that dosages and ratios as described above are met, then optionally mix with aggregates and optionally other additives.

In yet another embodiment of the present invention the at least one set retarder S and/or the at least one regulator R are mixed shortly after the addition of mixing water and optionally aggregates and optionally further additives to a cement or cementitious composition. As described above, the at least one set retarder S and the at least one regulator R can be admixed together as a pre-mix or individually. It is then, for example, possible to mix with additional set retarder S and/or regulator R, provided that dosages and ratios as described above are met. It is, for example possible, that a cementitious mixture is pre-mixed with the mixing water and the at least one set retarder S. The at least one regulator R of the general formula (I) is then admixed at a later stage, for example shortly before or during placement of said cementitious mixture. Preferably, admixing of the at least one regulator R is done continuously during placement, for example by dosing and mixing the at least one regulator R in the application head or the spray nozzle.

The method for regulating the hydration reaction according to the present invention leads to a an increase in open time of at least 15% of a cement or cementitious mixture, as compared to the open time of the same cement or cementitious mixture without any set retarder S and regulator R. At the same time, the method leads to a final setting time of a cement or cementitious mixture increased by not more than 75% when compared to a reference without any set retarder S and regulator R and decreased when compared to a reference containing only the set retarder S but not the regulator R. Furthermore, it leads to a height of the plateau of the cumulative heat flow curve of a cement or cementitious mixture which is the same or increased when compared to either a reference without any set retarder S and regulator R or to a reference containing only the set retarder S but not the regulator R.

The method for regulating the hydration reaction according to the present invention also leads to an increase of compressive strength at early age of a cement or cementitious mixture as compared to the same cement or cementitious mixture without any set retarder S and regulator R. In particular, a method for regulating the hydration reaction according to the present invention leads to an increase of compressive strength of a cement or cementitious mixture after curing for 4 h or 6 h or 8 h at 23° C./50% r.h. as compared to the compressive strength of a reference without an additive of the present invention.

The method for regulating the hydration reaction according to the present invention also leads to a retention or increase of initial spread flow and to an increase of retention of spread flow over the first 60 min after addition of mixing water.

Finally, the method for regulating the hydration reaction according to the present invention may lead to less bleeding of a cementitious mixture.

It is also possible to use an additive of the present invention in a method for retarding the hydration reaction of a cement or a cementitious mixture, comprising clinkers based on Ye'elimite. In particular, the setting of said cement or cementitious mixture is retarded and the open time is thus increased. According to embodiments, the retardation is possible with or without influence on final setting time and/or compressive strength, especially compressive strength at early age. The additive of the present invention can thus be used as a retarder as described for example in standard EN 934-2:2012-08. The present invention also relates to a cement or a cementitious mixture, comprising clinkers based on Ye'elimite, which is retarded by the addition of an additive of the present invention.

The following working examples illustrate the invention. The examples are not intended to limit the scope of the invention in any way.

WORKING EXAMPLES

The spread flow test, as a measure for workability of the cementitious mixture, was performed according to EN 12350-2. The spread flow test was performed on individual samples at defined points of time after mixing with mixing water. The respective times are given in below Tables 4 and 6.

Compressive strength was measured according to EN 12390-1 to 12390-4 on prisms of size 40×40×160 mm.

Heat flow curves were measured in an isothermal process as described in standard ASTM C1702-17. Examples M1-M19 were measured using a TAM AIR from TM Instruments. Examples M20-M33 were measured using an I-CAL 4000 from calmetrix. Cumulative heat flow curves were calculated from heat flow curves by integration using software default parameters.

The open time is the time at the point of inflection of the cumulative heat flow curve. It was measured on the heat flow curve as the time where the heat flow curve starts to increase (see FIGS. 2 and 4; the initial peak pertains to the mixing process and is disregarded). The final setting time was measured on the cumulative heat flow curve and is the time when the increase in energy measured per 12 min becomes less than 0.1 J/g (see FIGS. 1 and 3). The plateau height is the total energy released from the time of mixing with mixing water until the final setting time is reached.

The following Table 1 gives an overview of chemicals used. All chemicals were used as supplied unless otherwise noted.

TABLE 1 chemicals used

| Chemical name | Purity | Source |
| --- | --- | --- |
| Boric acid | ≥99.5% | Sigma Aldrich |
| Sulfamic acid | ≥99.3% | Sigma Aldrich |
| Methanesulfonic acid | ≥99% | Sigma Aldrich |
| Sodium gluconate | ≥99% | Sigma Aldrich |
| PCE-type comb polymer, acrylate/methallyl backbone, PEG side chain (2400 g/mol) | 31 w % in water | Sika Schweiz AG |

TABLE 2

Cement composition (XRD, Rietveld refinement)

| Phase | wt % |
| --- | --- |
| Ye'elimite | 29 |
| Belite | 46 |
| Ferrite | 4 |
| Calcium sulfate Anhydrite | 6 |
| Ellestadite | 4 |
| Calcium aluminates | 2 |
| Calcite | 1 |
| Amorphous | 8 |

Examples M1-17

For the preparation of cementitious mixtures M1-M17 100 g of a cement with the composition shown in Table 2, 50 g of mixing water to yield a w/c ratio of 0.5, and admixture as given in below Table 3 were mixed on a Heidolph propeller mixer for 2 min at 1500 rpm.

TABLE 3

Examples M1-M17

| Example | Additives |
| --- | --- |
| M1* | None |
| M2* | 0.05 g sodium gluconate |
| M3* | 0.5 g methanesulfonic acid |
| M4* | 0.5 g sulfamic acid |
| M5* | 0.2 g boric acid |
| M6 | 0.05 g sodium gluconate, 2.0 g methanesulfonic acid |
| M7 | 0.05 g sodium gluconate, 0.5 g methanesulfonic acid |
| M8 | 0.05 g sodium gluconate, 1.0 g methanesulfonic acid |
| M9 | 0.05 g sodium gluconate, 2.0 g sulfamic acid |
| M10 | 0.05 g sodium gluconate, 0.5 g sulfamic acid |
| M11* | 0.1 g PCE |
| M12* | 0.1 g PCE, 0.05 g sodium gluconate |
| M13 | 0.1 g PCE, 0.05 g sodium gluconate, 2.0 g sulfamic acid |
| M14 | 0.05 g PCE, 0.1 g sodium gluconate, 1.0 g sulfamic acid |
| M15 | 0.05 g PCE, 0.05 g sodium gluconate, 0.5 g sulfamic acid |
| M16 | 0.05 g PCE, 0.025 g sodium gluconate, 0.25 g sulfamic acid |
| M17 | 0.1 g sodium gluconate, 1.0 g sulfamic acid |

*comparative example not according to the invention

TABLE 4

Results M1-M17

| Example | Open time [min] | Final setting time [h] | Plateau height plateau [J/g] | Spread flow [mm] @ 0 min | @ 30 min | @ 60 min |
| --- | --- | --- | --- | --- | --- | --- |
| M1* | 83 | 9.3 | 180.4 | 67 | 52 | 46 |
| M2* | 158 | 15.2 | 182.4 | 101 | 92 | 81 |
| M3* | 93 | 8.9 | 189.1 | n.m. | n.m. | n.m. |
| M4* | 81 | 7.9 | 177.4 | n.m. | n.m. | n.m. |
| M5* | 166 | 9.9 | 186.8 | n.m. | n.m. | n.m. |
| M6 | 142 | 10.9 | 218 | 80 | 82 | 77 |
| M7 | 145 | 10.9 | 187.2 | 103 | 86 | 74 |
| M8 | 164 | 11.5 | 200.8 | n.m. | n.m. | n.m. |
| M9 | 96 | 8.9 | 207.6 | 68 | 64 | 60 |
| M10 | 134 | 10 | 179.7 | 93 | 72 | 65 |
| M11* | 200 | 12.3 | 175.8 | 145 | 143 | 148 |
| M12* | 386 | dnc | dnc | 157 | 166 | 167 |
| M13 | 168 | 10.4 | 196.4 | 152 | 169 | 163 |
| M14 | 254 | 14.7 | 188.0 | 140 | 146 | 143 |
| M15 | 166 | 11.7 | 180.4 | n.m. | n.m. | n.m. |
| M16 | 151 | 10.8 | 179.3 | n.m. | n.m. | n.m. |
| M17 | 215 | 12.1 | 185.3 | 95 | 88 | 75 |

*comparative example not according to the invention
n.m.: not measured
dnc: does not cure within 24 h Examples M18-30

For the preparation of cementitious mixtures M8-M30 265 g of CEN reference sand as described in EN 196-1 were added to 150 g of a cement with the composition shown in Table 2. The resulting dry mix was mixed in a Hobart mixer for 1 min. Then the amount of mixing water and additive as given in Table 5 was added to yield a w/c ratio as given in Table 5 and mixing was continued for 2 m.

TABLE 5

Examples M18-M30

| Example | Additives | Water | w/c ratio |
| --- | --- | --- | --- |
| M18* | None | 40 | 0.4 |
| M19* | 0.35 g boric acid | 50 | 0.5 |
| M20 | 0.05 g sodium gluconate, 0.5 g sulfamic acid | 50 | 0.5 |
| M21 | 0.1 g sodium gluconate, 0.7 g sulfamic acid | 50 | 0.5 |

TABLE 5-continued

Examples M18-M30

| Example | Additives | Water | w/c ratio |
|---|---|---|---|
| M22 | 0.05 g sodium gluconate, 0.25 g sulfamic acid | 50 | 0.5 |
| M23 | 0.025 g sodium gluconate, 0.25 g sulfamic acid | 50 | 0.5 |
| M24 | 0.1 g sodium gluconate, 1.0 g sulfamic acid | 50 | 0.5 |
| M25 | 0.15 g sodium gluconate, 1.5 g sulfamic acid | 50 | 0.5 |
| M26* | 0.0775 g PCE | 40 | 0.4 |
| M27* | 0.0775 g PCE, 0.35 g boric acid | 40 | 0.4 |
| M28 | 0.0775 g PCE, 0.1 g sodium gluconate, 1.0 g sulfamic acid | 40 | 0.4 |
| M29 | 0.0775 g PCE, 0.05 g sodium gluconate, 0.5 g sulfamic acid | 40 | 0.4 |
| M30 | 0.0775 g PCE, 0.05 g sodium gluconate, 0.5 g methanesulfonic acid | 40 | 0.4 |

*comparative example not according to the invention

TABLE 6

Results M18-M30

| Example | Open time [min] | Final setting time [h] | Plateau height [J/g] | Spread flow [mm] @ 0 min | @ 30 min | @ 60 min |
|---|---|---|---|---|---|---|
| M18* | 80 | 8.4 | 154.5 | 129 | n.m. | n.m. |
| M19* | 305 | 14.2 | 187.5 | 192 | 181 | 170 |
| M20 | 143 | 10.5 | 178.7 | n.m. | n.m. | n.m. |
| M21 | 226 | 12.8 | 176.5 | 218 | 189 | 173 |
| M22 | 149 | 11 | 175.0 | 210 | 172 | 159 |
| M23 | 93 | 9.85 | 176.5 | n.m. | n.m. | n.m. |
| M24 | 226 | 12.9 | 189.7 | n.m. | n.m. | n.m. |
| M25 | 405 | 19.32 | 199.5 | n.m. | n.m. | n.m. |
| M26* | 46 | 7.9 | 135 | 244 | 206 | 151 |
| M27* | 209 | 13 | 154.4 | 199 | 225 | 253 |
| M28 | 265 | 13.8 | 179.6 | 246 | 255 | 240 |
| M29 | 208 | 12.3 | 172 | 234 | 237 | 210 |
| M30 | 209 | 13.4 | 166.6 | n.m. | n.m. | n.m. |

*comparative example not according to the invention
n.m.: not measured

TABLE 7

Compressive strength results

| Example | Compressive strength [MPa] @ 4 h | @ 6 h | @ 8 h | @ 24 h |
|---|---|---|---|---|
| M19* | — | — | 2.1 | 19.2 |
| M21 | — | 0.6 | 3.4 | 15.9 |
| M22 | — | 3.9 | 10.6 | 17 |
| M27* | — | — | — | 29 |
| M28 | — | 0.8 | 4.6 | 27.2 |

—: not measurable
*comparative example not according to the invention

From the results presented in above Tables 3 to 7 it becomes evident that the non-inventive use of a regulator alone does not lead to an increase of open time. The non-inventive use of only a set retarder leads to significantly increased open times but also to strongly increased final setting times without any increase in plateau height. This is especially evident in case of non-inventive example M12, which did not show sufficient curing within 24 h.

On the other hand, examples M6-M8, M10, M13-M17, M20-M22, M24, and M29, which all are according to the present invention, show an open time which is significantly increased and a final setting time which is only moderately increased when compared to the references M1, or M18, respectively. At the same time the plateau height of all these examples according to the present invention is the same or increased as compared to the respective reference. This increase in plateau height correlates with a higher compressive strength at early age.

Inventive examples M9 and M23 show only moderate increase in open time but excellent increase in the plateau height together with a reduction or only slight increase of the final setting time when compared with the respective references. Finally, inventive examples M25, M28, and M30 show strongly increased open time over the reference. The final setting time is also increased in these cases, but this comes together with a strong increase in plateau height and thus with higher compressive strength at early age.

Non-inventive examples M5, M19, and M27, which all use only boric acid and thus are all not according to the present invention can be seen as a benchmark comparison. From results presented above it becomes evident that examples according to the present invention lead to a more balanced control of hydration at early age as compared to these benchmark examples.

From the spread flow measurement results as shown in above Tables 4 and 6 it becomes evident that examples according to the present invention do not have a significantly increase stickiness (which would be evident as a decreased initial spread flow) when compared to the respective references. Additionally, their spread flow retention is the same or better in all cases as compared to the respective references.

The invention claimed is:

1. A cementitious binder comprising
   a) at least one clinker based on Ye'elimite,
   b) at least one set retarder S selected from the group consisting of sugar acids, sugars, sugar alcohols, hydroxycarboxylic acids, phosphates, phosphonates, borates, and amines, and
   c) at least one regulator R of the general formula (I)

where:
   M is H, $NH_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of R—$SO_3$ is present, and
   R is chosen from $NH_2$, OH or from a hydrocarbon group with 1 C atom which may be substituted by N and/or O.

2. The cementitious binder according to claim 1, wherein the clinker contains 5-95 w %, based on the total dry weight of the clinker, of Ye'elimite.

3. The cementitious binder according to claim 1, wherein the cementitious binder contains 5-99 w % of clinker, 0.01-2 w % of sodium gluconate, and 0.1-6 w % of the at least one regulator R of the general formula (I).

4. The cementitious binder according to claim 3, wherein the set retarder S is sodium gluconate, and in the general formula (I), M is H, and R is chosen from $CH_3$ or $NH_2$.

5. The cementitious binder according to claim 1, wherein M is selected from the group consisting of Li, Na, K, MgX, CaX, and NiX, where X is $RSO_3$.

6. The cementitious binder according to claim 1, wherein the set retarder S is sodium gluconate, and in the general formula (I), M is H, and R is chosen from $CH_3$ or $NH_2$.

7. A cementitious mixture comprising the cementitious binder according to claim 1, the cementitious mixture further comprising
   a) water,
   b) optionally aggregates, and
   c) optionally one or more further additives selected from the group consisting of plasticizers, superplasticizers, shrinkage reducers, air entrainers, deaerating agents, stabilizers, viscosity modifiers, water reducers, accelerators, retarders, water resisting agents, strength enhancing additives, fibres, blowing agents, pigments, and steel passivating agents.

8. Shaped articles, obtainable by curing the cementitious binder according to claim 1 or a cementitious mixture comprising the cementitious binder.

9. A method for control of a hydration reaction at early age of a cement or a cementitious mixture, comprising
   a) providing a clinker or a cement or a cementitious mixture based on Ye'elimite,
   b) providing at least one set retarder S selected from the group consisting of sugar acids, sugars, sugar alcohols, hydroxycarboxylic acids, phosphates, phosphonates, borates, and amines,
   c) providing at least one regulator R of the general formula (I), (I)

where:
   M is H, $NH_4$ or chosen from a monovalent or divalent metal of the groups Ia, IIa, IIIa, Ib, IIb, IVb, VIb, VIIb or VIIIb of the periodic table of elements, and, where M is a divalent metal, a second equivalent of $R-SO_3$ is present, and
   R is chosen from $NH_2$, OH or from a hydrocarbon group with 1 C atom which may be substituted by N and/or O,
   d) providing water,
   e) optionally providing aggregates,
   f) optionally providing further additives, and
   g) mixing a) to f) in any given order.

10. The method according to claim 9, wherein the at least one set retarder S and the at least one regulator R are provided as individual components during any steps of the mixing.

11. The method according to claim 9, wherein the at least one set retarder S and the at least one regulator R are provided as a one component pre-mix during any step of the mixing.

* * * * *